T. E. MURRAY, Jr.
ELECTRIC WELDING APPARATUS.
APPLICATION FILED MAY 2, 1919.
1,320,894.
Patented Nov. 4, 1919.
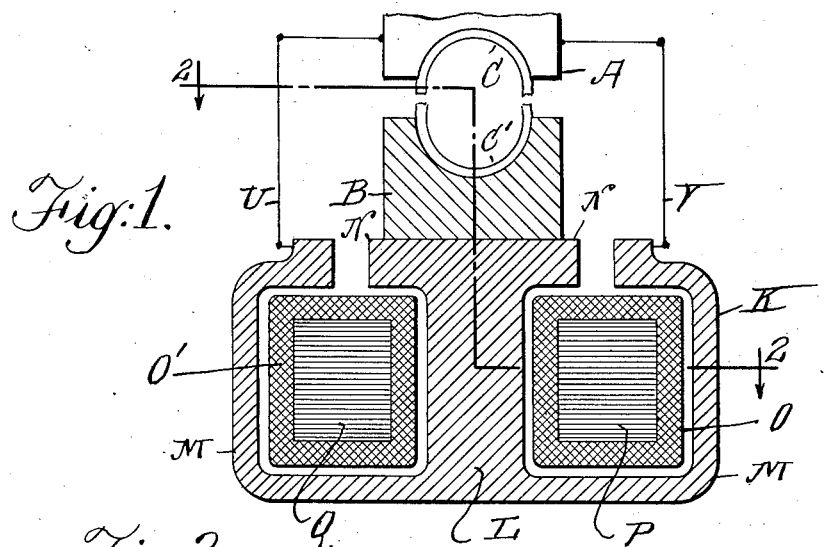
Fig. 1.
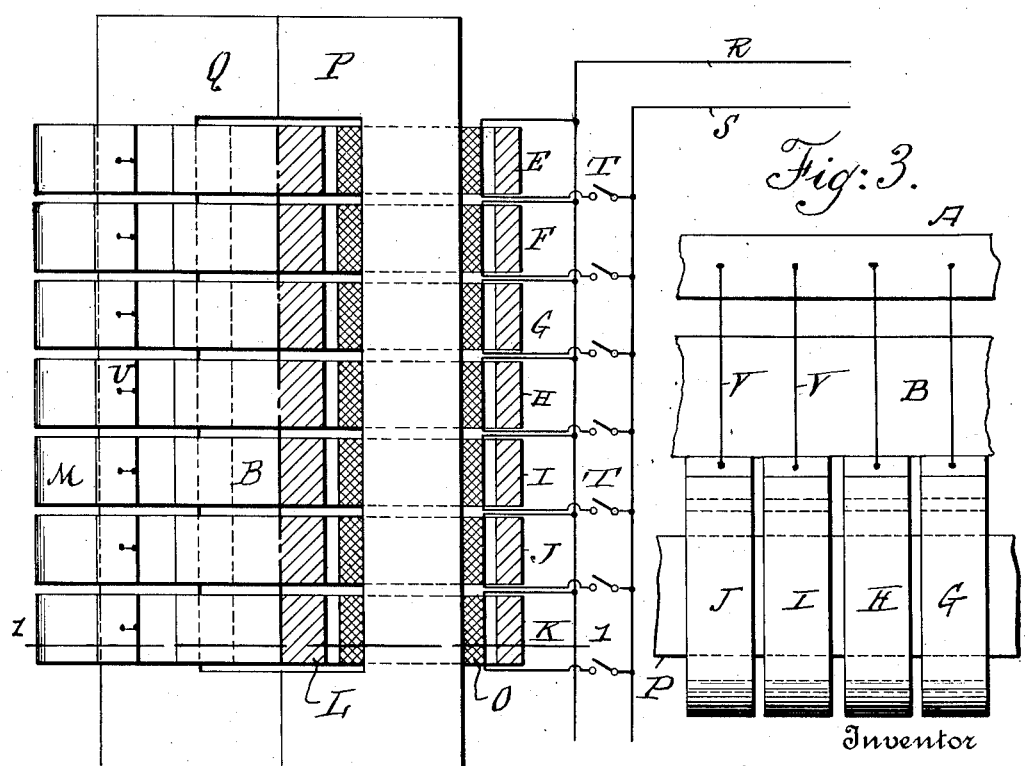
Fig. 2.
Fig. 3.
Inventor
Thomas E. Murray Jr.
By his Attorney

UNITED STATES PATENT OFFICE.

THOMAS E. MURRAY, JR., OF BROOKLYN, NEW YORK.

ELECTRIC WELDING APPARATUS.

1,320,894.          Specification of Letters Patent.          Patented Nov. 4, 1919.

Application filed May 2, 1919. Serial No. 294,298.

*To all whom it may concern:*

Be it known that I, THOMAS E. MURRAY, Jr., a citizen of the United States, residing at Brooklyn, in the county of Kings and State of New York, have invented a certain new and useful Improvement in Electric Welding Apparatus, of which the following is a specification.

In electrically welding together two objects by a current traversing the joint, certain difficulties arise, the effect of which, generally stated, is to make the weld not uniform throughout the welded areas. As a consequence, there may be localized portions of said areas where the weld is, relatively speaking, imperfect as compared with the remaining or intervening portions—this being due to an unequal distribution of the welding current, which in some places may be of less strength than is required properly to heat the metal, or in others of too great strength, with the result of overheating or burning the metal. These conditions chiefly develop with an increase of the area of the welded surfaces or when a change of shape thereof is made, whereby while the area remains constant, it becomes elongated in one dimension, or when the physical character of the metal traversed by the current is different at one or more places from that obtaining at another place or other places, or when the thickness of a welded object differs and the path of the current traversing that thickness becomes longer or shorter correspondingly.

Thus to illustrate: Assume that two longitudinal half sections of a tube of uniform diameter placed with their edges in registering contact are to be united. Then if the current be led into the work, say near one end thereof, that current will not be equally distributed, because some of it will pass directly to the joint in a line perpendicular to the plane of the joint, while the rest will reach the joint in lines at an angle to said plane, these angles diminishing in accordance with the length of tube traversed. Therefore, the resistance offered by the work to the passage of the current will increase from one end of the tube to the other, and the heating effect will proportionately decrease, and the longer the tube, the greater this decrease will be at one end as compared with the other.

Again assume the sections to taper, so that the resulting tube will not be of uniform but of varying diameter. Then if the sections be seated in correspondingly shaped recesses in the opposing faces of two cubical electrodes, the current will traverse a shorter distance in reaching the larger end of the tube than in reaching the smaller end, with corresponding variations in resistance and heating effect.

Again assume under the above stated condition of a tube of uniform diameter, the character of the metal varies over certain localized areas, so that a difference of resistance to the passage of the current results at these areas as compared with the resistance elsewhere. Corresponding variations in heating effect will follow.

Again assume that while the external diameter of the tube is uniform, the interior diameter is not. Then the current in reaching the joint will pass over paths in the metal longer in some places than in others, with, as before, variations in heating effect.

Again assume that through slight deformations of the sections, they do not accurately fit the electrodes, so that at some points they are in close contact, and in others separated. There will be greater resistance at the air gaps or places of imperfect contact than elsewhere, and corresponding variations in heating effect will ensue.

The foregoing examples—and others might be added—will be sufficient to show the nature of the problem which my present invention solves, namely, despite conditions such as above stated, which normally cause an irregularity in current distribution at the joint and consequent corresponding differences in heating effect, to provide means whereby such conditions are neutralized or overcome, and either a uniform distribution of heating effect to a degree sufficient for all practical purposes is achieved, or where it is desired that a certain part or parts of the joint may be more or less heated than another part or parts, that result can also to a degree sufficient for all practical purposes be accomplished.

In order to illustrate my invention, I here show an apparatus for welding the longitudinal half sections of a tube of uniform diameter, uniform thickness and of homogeneous metal, in which I can distribute the current over localized areas of the joint.

In the accompanying drawings—

Figure 1 is a transverse section on the line 1, 1 of Fig. 2 through the welding electrodes and one of the transformers, the upper movable electrode being shown partly broken away, and its operating mechanism being omitted. Fig. 2 is a section on the line 2, 2 of Fig. 1. Fig. 3 is a side elevation of a portion of the core, four of the transformer secondaries, and portions of the electrodes.

Similar letters of reference indicate like parts.

A is the upper welding electrode, which is to be provided with any suitable mechanism for moving it toward and from the lower fixed electrode B. In said electrodes are registering semicircular recesses, in which respectively are seated two longitudinal half sections C, C' of a tube of uniform diameter.

E, F, G, H, I, J, K are the secondaries of a series of transformers. Each secondary comprises an upright pillar L, from the lower side of which extend integral arms M, first horizontal, then vertical and then turned inwardly, with their inturned ends separated by air gaps from the vertical edges of the flanges N on the upper end of pillar L. In each of the loops formed by the arms M is a primary coil O, so that there are two series of coils; one series on each side of pillar L. Through all the coils on one side passes a core P, and through all the coils on the opposite side passes a core Q. The ends of the cores P, Q which protrude beyond the outside coils of the two series are turned toward one another, and preferably meet.

The primary coils O on the right hand side of Fig. 1 are connected in branch circuits to the leads R, S, which come from the source of welding current. In each branch is interposed a switch T, so that any single coil, or any group of coils, can be cut out of or brought into circuit with the source of current supply. The circuit connections with the primary coils O on the opposite side of the apparatus are exactly the same and have been omitted in Fig. 2 for clearness.

The fixed electrode B rests upon, is in contact with and extends transversely across all the secondary pillars L. The upper electrode A is connected in any suitable way which will permit of its free upward and downward movement to each of the secondary arms M. I here show such connections made by flexible wires U, V.

While I have represented in Fig. 2 but seven transformers, it will be obvious that any number may be used, placed in succession, as shown, the cores P, Q being correspondingly elongated. This number will depend upon the length of the work to be welded. So also the number of transformers will depend upon the desired degree of variation in current distribution.

In such case if the connection of the electrodes to the source of welding current is arbitrarily made, it may happen that the current will be unequally distributed at the joint—or, in other words, exercise a different heating effect at some localized areas or points from that exercised at other areas or points along the length of the joint. Hence imperfect welding or overheating of the metal at some localized areas or points along the joint may result.

By the employment of the plurality of transformers placed as described, and the provision of means whereby any transformer, or any selected group or groups of transformers, can be energized from the source of supply, and the connection of these transformers in branch circuits to the electrodes, I can distribute the current so that the electrodes will be uniformily heated and the metal uniformly brought to welding condition over the whole joint.

If it be desired to confine the heating effect to certain localized areas, I may do this by cutting out one or more transformers, or arranging them in groups to act upon the localized areas only. One way of doing this which I here illustrate, is the provision of a switch T, as described, in the circuit of each primary coil, whereby the transformer controlled may be cut out. Other ways, such as the cutting out of some of the turns of a given primary, will readily suggest themselves to any electrician. It is known, for example, that where two elongated objects are disposed with their ends exposed to the air, the cooling effect of the atmosphere is apt to cause imperfect joints at such ends. In such case, I should energize the two end transformers, even if a sufficient distribution of heating effect over the bodies of the objects were found obtainable with a less number than all of the intermediate transformers. Again, instead of welding two long sections together by a current discharge through all of the branch connections simultaneously, I may do so by closing the transformer primary circuits successively, thus concentrating the whole current upon successive localized areas.

I claim:

1. An electric welding apparatus, comprising two coöperating welding electrodes, and means for controlling the welding current traversing the joint between the bodies to be welded to heat the same over a certain predetermined localized fractional area of said joint.

2. An electric welding apparatus, comprising two coöperating welding electrodes, and means for controlling the welding current traversing the joint between the bodies to be welded to heat the same over a plurality of predetermined localized fractional areas of said joint.

3. An electric welding apparatus, comprising two coöperating welding electrodes, and means for diverting the welding current traversing the joint between the bodies to be welded from one to another predetermined localized fractional areas of said joint.

4. An electric welding apparatus, comprising two coöperating welding electrodes, and means for dividing the welding current traversing the joint between the bodies to be welded to cause said current to pass through a plurality of predetermined localized fractional areas of said joint.

5. An electric welding apparatus, comprising two coöperating welding electrodes, one of said electrodes being fixed and the other movable, a support of conducting material in contact with said fixed electrode and means for directing the welding current through predetermined localized fractional areas of said support.

6. An electric welding apparatus, comprising two coöperating welding electrodes, one of said electrodes being fixed and the other movable, a support of conducting material in circuit with said electrodes, with which support said fixed electrode is in contact, and means for dividing the welding current traversing said support.

7. An electric welding apparatus, comprising two coöperating welding electrodes, a plurality of branch circuits for conveying the welding current to said electrodes, and current controlling means in each of said branch circuits.

8. An electric welding apparatus, comprising two coöperating welding electrodes, a plurality of transformers having corresponding secondary terminals electrically connected to one of said electrodes, and means for energizing independently one or more of said transformers.

9. An electric welding apparatus, comprising a plurality of transformers having portions of their secondaries disposed with their corresponding polar surfaces in the same plane, a fixed welding electrode in contact with said surfaces of said secondaries, and a movable electrode coöperating with said fixed electrode.

10. An electric welding apparatus, comprising a plurality of transformers having portions of their secondaries disposed with their corresponding polar surfaces in the same plane, a fixed welding electrode in contact with said surfaces of said secondaries, a movable electrode coöperating with said fixed electrode, and means for independently energizing each of said transformers.

11. An electric welding apparatus, comprising a fixed welding electrode, a movable welding electrode coöperating with said fixed electrode, a plurality of transformers having their primary coils in branch circuit with the source of welding current, and each having a secondary comprising a stationary pillar and an arm in loop form extending from one side thereof, the said fixed electrode being in contact with and resting upon and extending transversely across said pillars, and the said movable electrode being in branch circuit with each of said arms, and means for independently controlling the welding current in each of said primary branch circuits.

12. An electric welding apparatus, comprising a fixed welding electrode, a movable welding electrode coöperating with said fixed electrode, a plurality of transformers having their primary coils in branch circuit with the source of welding current, and each having a secondary comprising a stationary pillar and an arm in loop form extending from the side thereof, said primary coils being inclosed in said arms, and the said fixed electrode being in contact with and resting upon and extending transversely across said pillars, and the said movable electrode being in branch circuit with each of said arms, a core extending through said primary coils, and means for independently controlling the welding current in each of said primary branch circuits.

In testimony whereof I have affixed my signature in presence of two witnesses.

THOMAS E. MURRAY, Jr.

Witnesses:
 GERTRUDE T. PORTER,
 MAY T. McGARRY.